(12) United States Patent  
Sakuragi

(10) Patent No.: US 9,394,006 B2
(45) Date of Patent: Jul. 19, 2016

(54) CENTER PILLAR STRUCTURE
(71) Applicant: SUZUKI MOTOR CORPORATION, Hamamatsu (JP)
(72) Inventor: Akishige Sakuragi, Hamamatsu (JP)
(73) Assignee: SUZUKI MOTOR CORPORATION, Hamamatsu (JP)
( * ) Notice: Subject to any disclaimer, the term of this patent is extended or adjusted under 35 U.S.C. 154(b) by 0 days.
(21) Appl. No.: 14/808,447
(22) Filed: Jul. 24, 2015
(65) Prior Publication Data
US 2016/0039470 A1 Feb. 11, 2016

(30) Foreign Application Priority Data

Aug. 5, 2014 (JP) .................................. 2014-159300

(51) Int. Cl.
*B62D 25/04* (2006.01)
*B62D 21/15* (2006.01)
(52) U.S. Cl.
CPC .............. *B62D 25/04* (2013.01); *B62D 21/157* (2013.01)
(58) Field of Classification Search
CPC .... B62D 25/02; B62D 25/04; B62D 25/2036; B62D 21/157
USPC ............. 296/187.03, 187.12, 193.05, 193.06, 296/203.01, 203.03
See application file for complete search history.

(56) References Cited

U.S. PATENT DOCUMENTS

| | | | | |
|---|---|---|---|---|
| 8,491,047 B1 * | 7/2013 | Moll | ...................... | B62D 25/04 296/193.06 |
| 2010/0194147 A1 * | 8/2010 | Aul | ........................ | B62D 25/04 296/193.06 |
| 2011/0101734 A1 * | 5/2011 | Gunther | ................. | B62D 25/04 296/193.06 |
| 2012/0153675 A1 * | 6/2012 | Rawlinson | ............. | B62D 25/04 296/193.06 |
| 2012/0256445 A1 * | 10/2012 | Baccouche | ............ | B62D 25/04 296/193.06 |
| 2013/0241239 A1 * | 9/2013 | Mori | ...................... | B62D 25/04 296/193.06 |
| 2014/0028056 A1 * | 1/2014 | Nishimura | ............. | B62D 25/04 296/193.06 |
| 2014/0145469 A1 * | 5/2014 | Mildner | ............... | B62D 29/005 296/193.06 |
| 2014/0339855 A1 * | 11/2014 | Torii | ...................... | B62D 25/04 296/193.06 |
| 2015/0091327 A1 * | 4/2015 | Kim | ......................... | B21B 1/12 296/187.03 |
| 2015/0175211 A1 * | 6/2015 | Shinoda | ................. | B62D 25/04 296/193.06 |

FOREIGN PATENT DOCUMENTS

JP   2011219014   11/2011
JP   2012136190   7/2012

* cited by examiner

*Primary Examiner* — Gregory Blankenship
(74) *Attorney, Agent, or Firm* — Silicon Valley Patent Group LLP

(57) ABSTRACT

A center pillar structure for a vehicle comprises a center pillar including an outer panel and an inner panel that are joined together and form a closed cross section. The inner panel includes a front flange and a rear flange that are elongate in the vertical direction, a front surface and a rear surface that extend toward the vehicle interior side respectively from a rear end of the front flange and a front end of the rear flange, and a base surface that connects the front surface and the rear surface. Dimensions of the front surface and the rear surface in the vehicle width direction increase as the center pillar extends upward from a lower end of the center pillar to a height of the belt line, and decrease as the center pillar further extends upward from the belt line to the upper end.

2 Claims, 6 Drawing Sheets

A-A  C-C

B-B

CENTER PILLAR STRUCTURE

CROSS-REFERENCE TO RELATED APPLICATION

This application is based upon and claims the benefit of priority from the prior Japanese Patent Application No. 2014-159300, filed on Aug. 5, 2014, the entire contents of which are incorporated herein by reference.

FIELD

The present invention relates to a center pillar structure extending in a vertical direction at the center of a lateral portion of a vehicle body.

BACKGROUND

A center pillar provided in a vehicle such as an automobile includes an outer panel that is exposed on the outer surface of a lateral portion of a vehicle body, and an inner panel that is joined to the outer panel on a compartment side. In some cases, a reinforcement is further interposed between these panels.

In general, the center pillar has a shape that is curved or inclined toward the vehicle interior side as the center pillar extends from the vicinity of the so-called belt line toward the upper end, as viewed from the vehicle front side. Therefore, the curvature of the center pillar is at its maximum near the belt line, and when a load is input to the center pillar from the vehicle upper side or a vehicle lateral surface, the center pillar is easily deformed near the belt line.

Japanese Patent Laid-open Publication No. 2011-219014 A describes a center pillar structure including a belt anchor reinforcement to which a seat belt anchor is fixed in addition to an outer reinforcement that is disposed so as to extend along the outer panel. The outer panel and the inner panel each include a front flange and a rear flange that are disposed across a gap in a vehicle front-rear direction and that are elongate in the vertical direction. The belt anchor reinforcement connects the front flange and the rear flange in a straight line in the vehicle front-rear direction. Japanese Patent Laid-open Publication No. 2011-219014 A states that it is possible to improve proof stress with respect to loads input from the vehicle upper side by adding the belt anchor reinforcement to the center pillar.

Japanese Patent Laid-open Publication No. 2012-136190 A describes a center pillar structure including an outer reinforcement that is disposed between the outer panel and the inner panel and that has a projecting portion and a recessed portion. In the outer reinforcement, the height of the projecting portion or the depth of the recessed portion is at its maximum at the belt line, and the height of the projecting portion or the depth of the recessed portion is reduced as the outer reinforcement extends from the belt line toward the vehicle upper side or the vehicle lower side. Japanese Patent Laid-open Publication No. 2012-136190 A states that by disposing such an outer reinforcement, the center pillar is hard to deform when loads are input from the vehicle lateral surface.

However, although the center pillar structure described in Japanese Patent Laid-open Publication No. 2011-219014 A is thought to have improved proof stress with respect to loads input from the vehicle upper side, there is a possibility that the center pillar structure is easily deformed with respect to loads input from the vehicle lateral surface. In addition, weight and cost are increased as the belt anchor reinforcement is added.

Although the rigidity of the center pillar structure described in Japanese Patent Laid-open Publication No. 2012-136190 A is improved by gradually changing the shape of the projecting portion and the recessed portion of the outer reinforcement in the vehicle vertical direction, there is a possibility that the inner panel is deformed when loads are input from the vehicle upper side or the vehicle lateral surface.

In view of the foregoing problems, it is an object of the present invention to provide a center pillar structure with which the rigidity of the inner panel can be ensured and the deformation near the belt line can be suppressed when loads are input.

SUMMARY OF THE DISCLOSURE

In order to solve the foregoing problems, a center pillar structure according to the present invention having a typical configuration is a center pillar structure for a vehicle including a center pillar extending in a vertical direction at a center of a lateral portion of a vehicle body, the center pillar being curved or inclined toward a vehicle interior side at least above a belt line, wherein the center pillar includes an outer panel in which a curvature is at its maximum near the belt line, as viewed from a vehicle front side, and an inner panel that is joined to the outer panel on the vehicle interior side and forms a closed cross section together with the outer panel, the center pillar structure for a vehicle further comprises an upper door hinge and a lower door hinge that are attached to the outer panel at positions spaced apart from each other in the vertical direction below the belt line and support a vehicle door such that the vehicle door can be opened and closed, the inner panel includes a front flange and a rear flange that are disposed spaced apart from each other in a vehicle front-rear direction, are joined to the outer panel, and are elongate in the vertical direction, a front surface and a rear surface that extend toward the vehicle interior side respectively from a rear end of the front flange and a front end of the rear flange, and a base surface that connects the front surface and the rear surface, and dimensions of the front surface and the rear surface in the vehicle width direction increase as the center pillar extends upward from a height below the upper door hinge to a height of the belt line, and decrease as the center pillar extends upward from the belt line to the upper end of the center pillar.

With the present invention, the curvature of the outer panel is at its maximum near the belt line, that is, the outer panel is rapidly curved near the belt line. On the other hand, the dimensions of the front surface and the rear surface of the inner panel in the vehicle width direction, that is, the projecting lengths of the base surface from the front flange and the rear flange already start to increase at a height below the upper door hinge, and are at their maximum at the height of the belt line. Thereafter, conversely, the above dimensions decrease as the inner panel extends upward to the upper end of the center pillar.

With this configuration, unlike the case where the outer panel is rapidly curved or inclined near the belt line and the curvature increases, the base surface of the inner panel is gently curved toward the vehicle interior side across a wide range, and the curvature of the overall base surface in the vertical direction decreases. Accordingly, the concentration of bending force near the belt line can be avoided, and the center pillar is hard to deform with respect to the loads applied during a side collision or lateral turning.

Moreover, as the inner panel progresses downward from the height of the belt line, the above dimensions are finally at their minimum below the upper door hinge. That is, since the above dimensions are not at their minimum yet at a position of the inner panel where the upper door hinge is located, a structure for supporting a vehicle door can be improved.

Furthermore, since the above dimensions are at their maximum at the height of the belt line, the width of a closed cross section at the belt line is increased, thus making it possible to ensure the rigidity of the center pillar. It should be noted that the above dimensions can be made smaller than before at a position located at a height other than the height of the belt line, such as the upper end or the lower end of the center pillar, and therefore, a compartment space is not narrowed.

It is preferable that the curvature of the inner panel is constant from the upper end of the center pillar to the height below the upper door hinge. Thereby, the curvature of the inner panel is constant and the inner panel is smooth as a whole, and the concentration of bending force can be avoided, thus making it possible to improve the durability against the loads.

With the present invention, it is possible to provide a center pillar structure with which the rigidity of the inner panel can be ensured and the deformation near the belt line can be suppressed when loads are input.

DETAILED DESCRIPTION

Figure 1A:
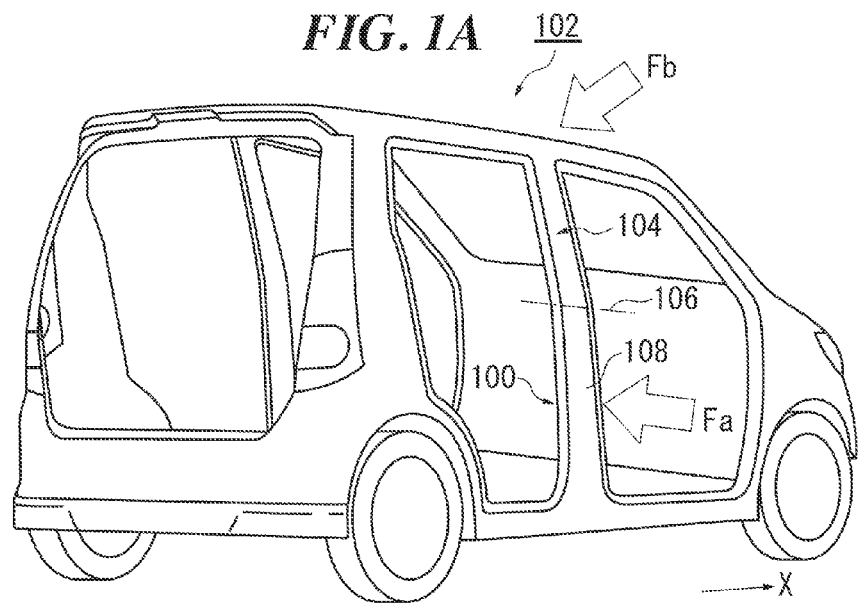
FIGS. 1A and 1B show diagrams schematically illustrating a vehicle to which a center pillar structure according to one embodiment is applied.

Hereinafter, a preferred embodiment of the present invention will be described in detail with reference to the accompanying drawings. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

Figure 1B:
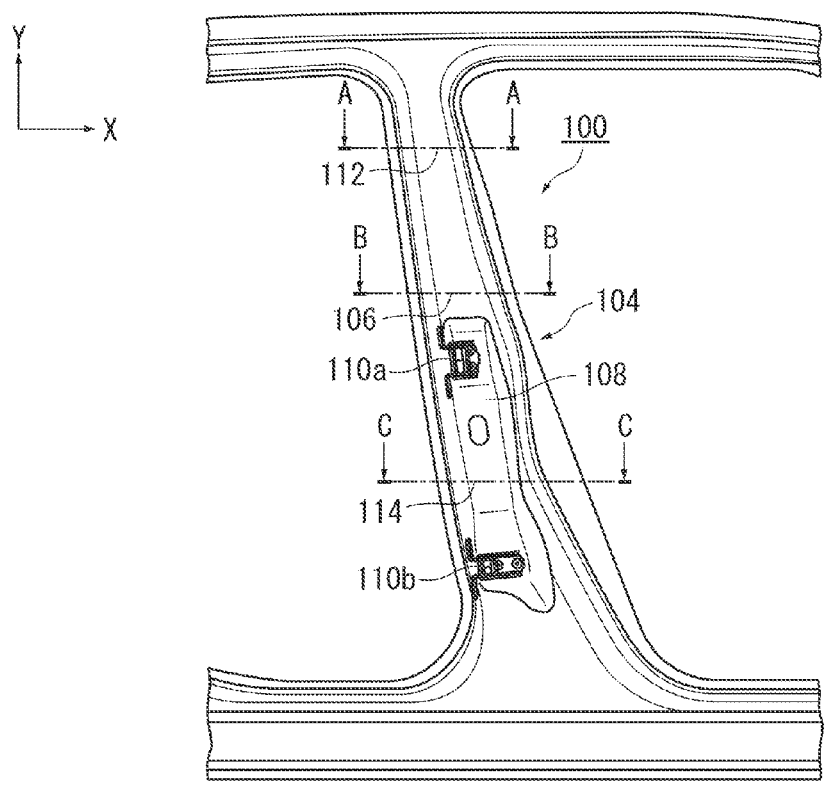
Figure 2:
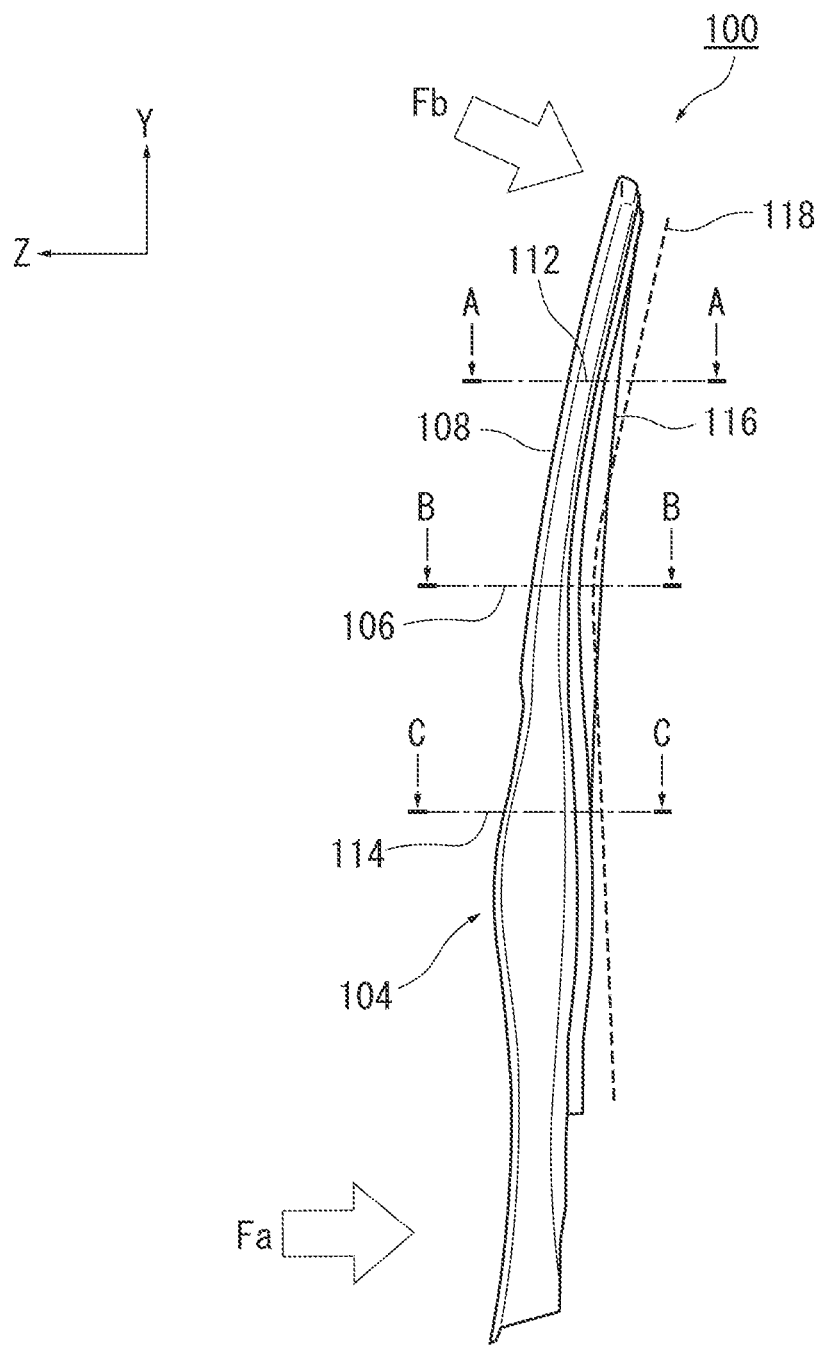
FIG. 2 is a diagram of the center pillar structure in FIGS. 1A and 1B, as viewed from a vehicle front side.

FIGS. 1A and 1B show diagrams schematically illustrating a vehicle 102 to which a center pillar structure 100 according to this embodiment is applied. FIG. 1A is a schematic view of the vehicle 102, as viewed obliquely from the vehicle right rear side. FIG. 1B is a diagram illustrating an area near the center of the lateral portion of the vehicle body of the vehicle 102 in FIG. 1A, as viewed from the vehicle right side. FIG. 2 is a diagram of the center pillar structure 100 in FIGS. 1A and 1B, as viewed from a vehicle front side. Hereinafter, arrows X, Y and Z shown in the diagrams respectively indicate the vehicle front side, vehicle upper side and vehicle outer side.

The center pillar structure 100 includes a center pillar 104 as shown in FIG. 1A. The center pillar 104 extends in the vertical direction at the center of the lateral portion of the vehicle body, and generally has a shape that is curved or inclined toward the vehicle interior side above a belt line 106 to meet the requirements in terms of design (see FIG. 2). Although the center pillar 104 merely extends in the vertical direction below the belt line 106 in this manner, the center pillar 104 starts to be curved or inclined toward the vehicle interior side on reaching the belt line 106. Therefore, the curvature of an outer panel 108 of the center pillar 104 is at its maximum near the belt line 106, as viewed from the vehicle front side. It should be noted that the belt line 106 is a line that passes through the lower end of a window frame of a vehicle door (not shown) and extends in the vehicle front-rear direction.

As shown in FIG. 1B, the center pillar structure 100 further comprises an upper door hinge 110a and a lower door hinge 110b. The upper door hinge 110a and the lower door hinge 110b are attached to the outer panel 108 at positions spaced apart from each other in the vertical direction below the belt line 106, and support a vehicle door (not shown) such that the vehicle door can be opened and closed. It should be noted that line A-A shown in FIGS. 1B and 2 is located at the height of an upper end 112 of the center pillar 104 above the belt line 106. Line B-B is located on the belt line 106. Line C-C is located at the height of a lower end 114 of the center pillar 104 below the upper door hinge 110a.

As shown in FIG. 2, a load Fa may be input to the vehicle 102 from the lateral surface of the vehicle during a side collision or a load Fb may be input to the vehicle 102 from the vehicle upper side during lateral turning. When such a load Fa or Fb is input, a bending moment is likely to concentrate near the belt line 106 in a common center pillar, and thus the center pillar is easily deformed near the belt line 106.

Therefore, in this embodiment, a configuration is adopted in which the deformation of the center pillar 104 caused by the input load Fa or Fb is suppressed by changing not the shape of the outer panel 108, which is difficult to change due to the requirements in terms of design, but the shape of an inner panel 116 shown in FIG. 2.

Figure 3A:
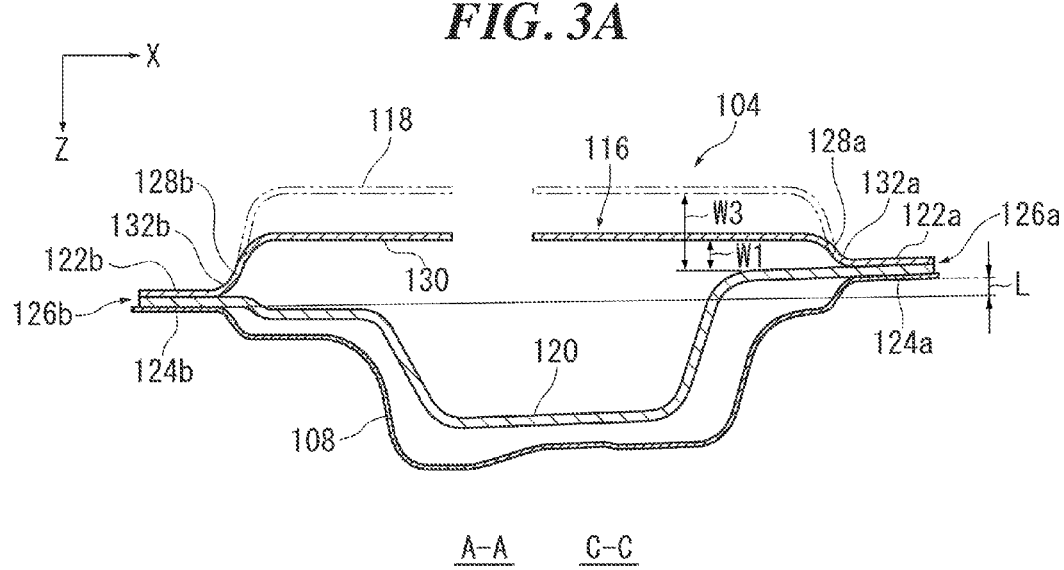
FIGS. 3A and 3B show cross-sectional views of the center pillar structure in FIG. 2.
Figure 3B:
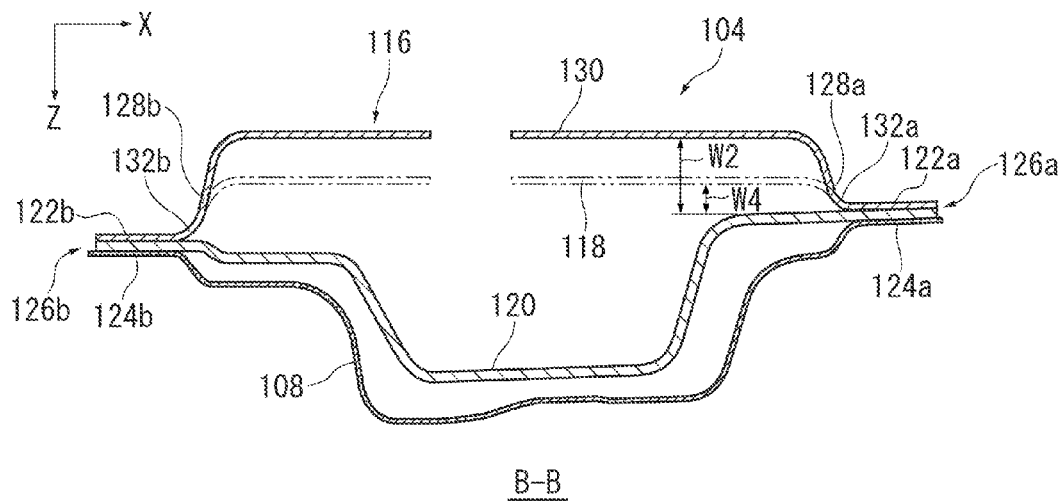
Figure 4:
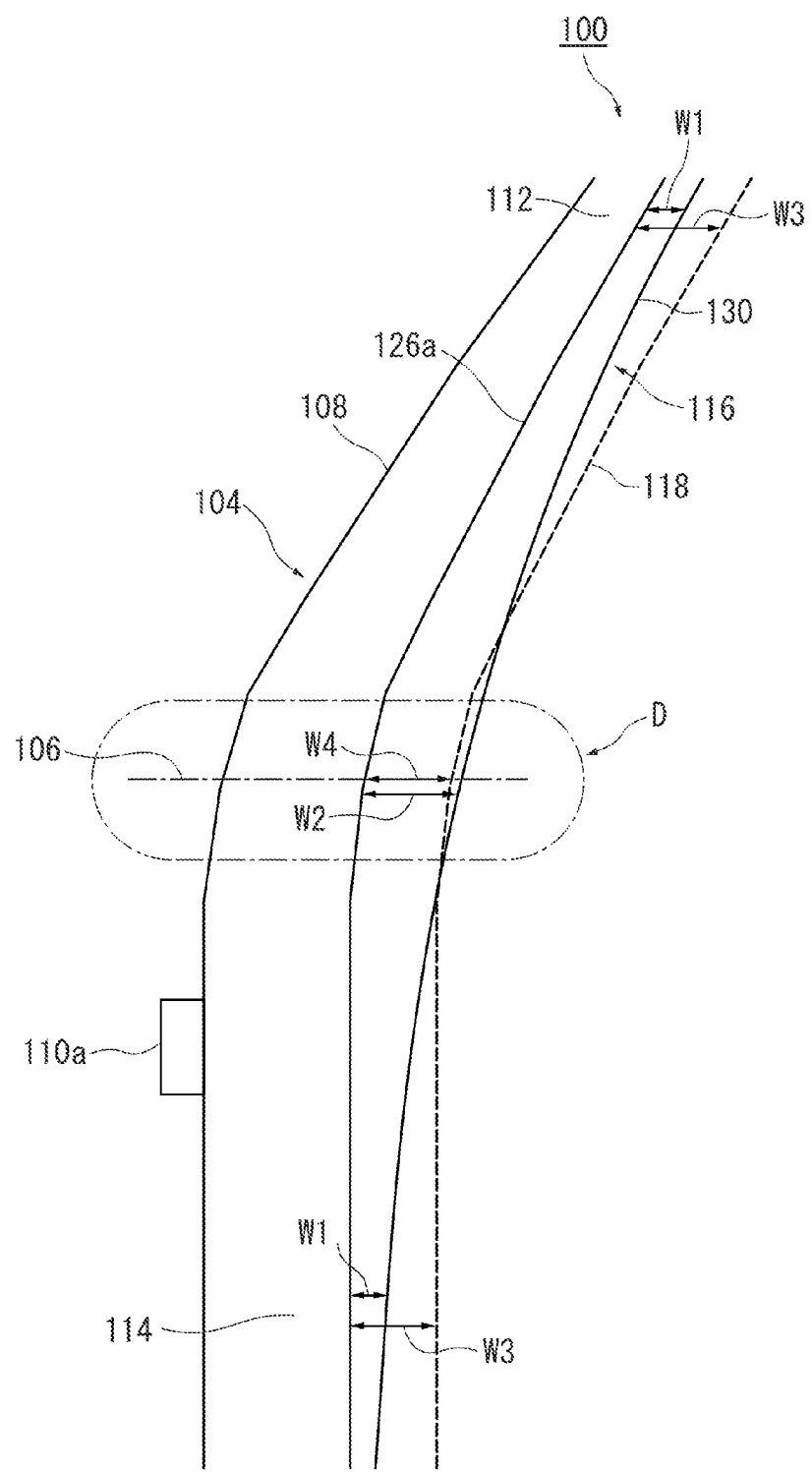
FIG. 4 is a schematic view of the center pillar structure in FIG. 2.

FIGS. 3A and 3B show cross-sectional views of the center pillar structure 100 in FIG. 2. FIG. 3A is a cross-sectional view taken along line A-A or line C-C, and FIG. 3B is a cross-sectional view taken along line B-B. FIG. 4 is a schematic view of the center pillar structure 100 in FIG. 2. A region D shown in FIG. 4 is a region near the belt line 106. Moreover, an inner panel 118 is shown as a comparative example in each diagram.

The inner panel 116 of the center pillar structure 100 is joined to the outer panel 108 on the vehicle interior side as shown in FIG. 2. As shown in FIGS. 3A and 3B, the center pillar 104 further includes a reinforcement 120. The reinforcement 120 is located between the outer panel 108 and the inner panel 116, and is joined to the outer panel 108 and the inner panel 116, thus improving the rigidity of the center pillar 104.

As shown in FIGS. 3A and 3B, the inner panel 116 forms a closed cross section together with the outer panel 108, and includes a front flange 122a and a rear flange 122b. The front flange 122a and the rear flange 122b are disposed spaced apart from each other in a vehicle front-rear direction and are elongate in the vertical direction. The front flange 122a and the rear flange 122b are respectively joined to a front flange 124a and a rear flange 124b of the outer panel 108 via the reinforcement 120. The front flanges 122a and 124a are joined to each other via the reinforcement 120 and the rear flanges 122b and 124b are joined to each other via the reinforcement 120, so that joint surfaces 126a and 126b are respectively formed.

The inner panel 116 also includes a front surface 128a, a rear surface 128b and a base surface 130. The front surface 128a and the rear surface 128b extend toward the vehicle interior side respectively from a rear end 132a of the front flange 122a and a front end 132b of the rear flange 122b, and are formed to have a step shape, as viewed from the front flange 122a side and the rear flange 122b side. It should be noted that as shown in FIG. 3A, steps formed by the front surface 128a and the rear surface 128b are minimum steps with which the accuracy of the joint surfaces 126a and 126b can be ensured despite the magnitude of a dimension L caused by a difference between the positions of the joint surfaces 126a and 126b in the vehicle width direction.

The base surface 130 connects the front surface 128a and the rear surface 128b. If a bead or the like is formed on a surface of the base surface 130 to partially form projecting portions and recessed portions, the base surface 130 corresponds to a main surface other than the projecting portions and recessed portions. As schematically shown in FIG. 4, the dimension between the base surface 130 and the joint surface 126a in the vehicle width direction changes continuously, as viewed from the vehicle front side. In other words, this dimension is a projecting length of the base surface 130 from the front flange 122a, and is the dimension of the front surface 128a of the inner panel 116 in the vehicle width direction. This dimension is expressed as a dimension W1 in the cross-sectional view in FIG. 3A taken along line A-A or line C-C, and as a dimension W2 in the cross-sectional view in FIG. 3B taken along line B-B. It should be noted that the dimension between the base surface 130 and the joint surface 126b in the vehicle width direction changes continuously, as viewed from the vehicle rear side. This dimension is a projecting length of the base surface 130 from the rear flange 122b, and corresponds to the dimension of the rear surface 128b in the vehicle width direction.

For example, the dimension of the front surface 128a in the vehicle width direction increases as the center pillar 104 extends upward from the lower end 114, which is located below the upper door hinge 110a, to the height of the belt line 106. Furthermore, the dimension of the front surface 128a in the vehicle width direction decreases as the center pillar 104 extends upward from the belt line 106 to the upper end 112 of the center pillar 104. That is, the above dimension is the minimum dimension W1 at the upper end 112 and the lower end 114, and is the maximum dimension W2 at the belt line 106. It should be noted that the dimension of the upper end 112 and the dimension of the lower end 114 are not necessarily the same.

On the other hand, the dimension of the inner panel 118 of the comparative example is a dimension W3 at the upper end 112 and the lower end 114, and is larger than the dimension W1 of the inner panel 116 of this embodiment as shown in FIGS. 3A and 4. In addition, the dimension of the inner panel 118 is a dimension W4 at the belt line 106, and is smaller than the dimension W2 of the inner panel 116 as shown in FIGS. 3B and 4. Furthermore, as illustrated in FIG. 4, the above dimension of the inner panel 116 is larger than the dimension of the inner panel 118 not only at the belt line 106 but also in the region D including the belt line 106.

Figure 5:
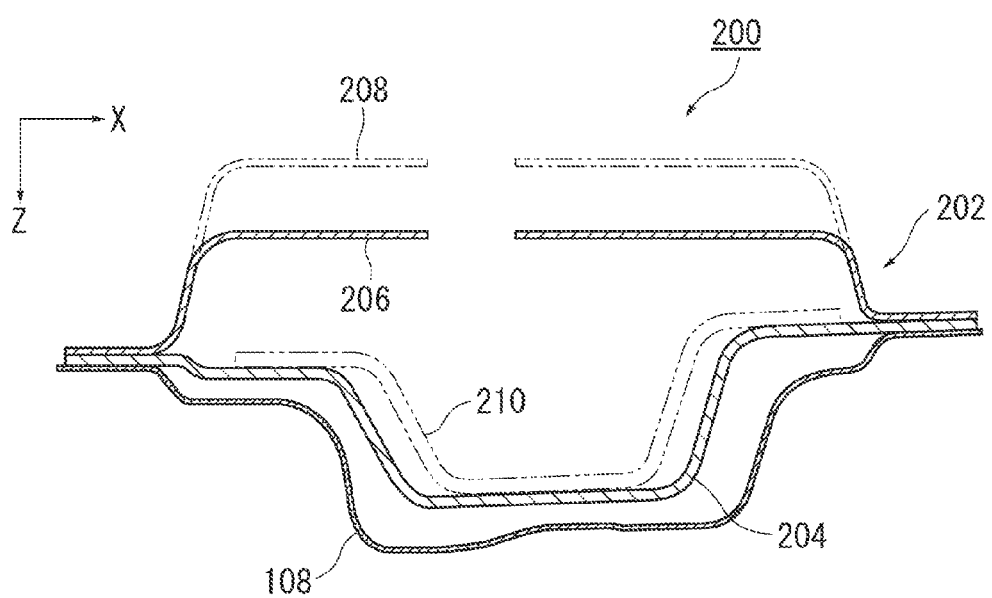
FIG. 5 is a cross-sectional view of a center pillar structure of a comparative example.

FIG. 5 is a cross-sectional view of a center pillar structure 200 of a comparative example. The existing method described below may be used for the center pillar structure 200 in order to improve the rigidity of the center pillar 202. For example, the thickness of a reinforcement 204 and the thickness of an inner panel 206 that is joined to the outer panel 108 via the reinforcement 204 are increased. Moreover, an inner panel 208 obtained by enlarging the inner panel 206 toward the vehicle interior side is used to increase the dimension of the closed cross section in the vehicle width direction. Furthermore, another reinforcement 210 is added to the center pillar 202. In addition, it is thought that the strength of materials of these members is improved.

However, if the thicknesses of the reinforcement 204 and the inner panel 206 are increased and the other reinforcement 210 is added, weight and cost are increased. If the inner panel 208, which is enlarged toward the vehicle interior side, is used, not only weight and cost are increased but also the compartment space is narrowed. Furthermore, if the strength of materials of the members is improved, the materials are expensive, and thus the cost is increased.

In contrast, in the center pillar 104 of this embodiment, the dimensions of the front surface 128a and the rear surface 128b of the inner panel 116 in the vehicle width direction already start to increase at a height below the upper door hinge 110a, and are at their maximum at the height of the belt line 106. Thereafter, conversely, these dimensions decrease as the inner panel 116 extends upward to the upper end 112 of the center pillar 104. On the other hand, the curvature of the outer panel 108 is at its maximum near the belt line 106 as described above, that is, the outer panel 108 is rapidly curved near the belt line 106.

That is, unlike the case where the outer panel 108 is rapidly curved or inclined near the belt line 106 and the curvature increases, the base surface 130 of the inner panel 116 is gently curved toward the vehicle interior side across a wide range. Therefore, the curvature of the overall base surface 130 in the vertical direction decreases. Accordingly, with the center pillar 104, the concentration of bending force near the belt line 106 can be avoided, and the center pillar is hard to deform with respect to the load Fa or Fb applied during a side collision or lateral turning.

Moreover, as the inner panel 116 progresses downward from the height of the belt line 106, the above dimensions are finally at their minimum below the upper door hinge 110a. In other words, since the above dimensions are not at their minimum yet at a position of the inner panel 116 where the upper door hinge 110a is located, a structure for supporting a vehicle door can be improved.

Furthermore, since the above dimensions are at their maximum at the height of the belt line 106, the width of the closed cross section at the belt line 106 is increased, thus making it possible to ensure the rigidity of the center pillar 104. It should be noted that as illustrated in FIG. 4, the width of the closed cross section refers to as a width of a closed cross section formed by joining the outer panel 108 to the inner panel 116 in the vehicle width direction, but is not limited thereto. For example, the width of the closed cross section may be a width of a closed cross section formed by joining the reinforcement 120 instead of the outer panel 108 to the inner panel 116 in the vehicle width direction. Moreover, the above dimensions are smaller than the dimension of the inner panel 118 of the comparative example at a height other than the height of the belt line 106, such as the upper end 112 or the lower end 114 of the center pillar 104. Therefore, with the inner panel 116, a compartment space is not narrowed.

Figure 6:
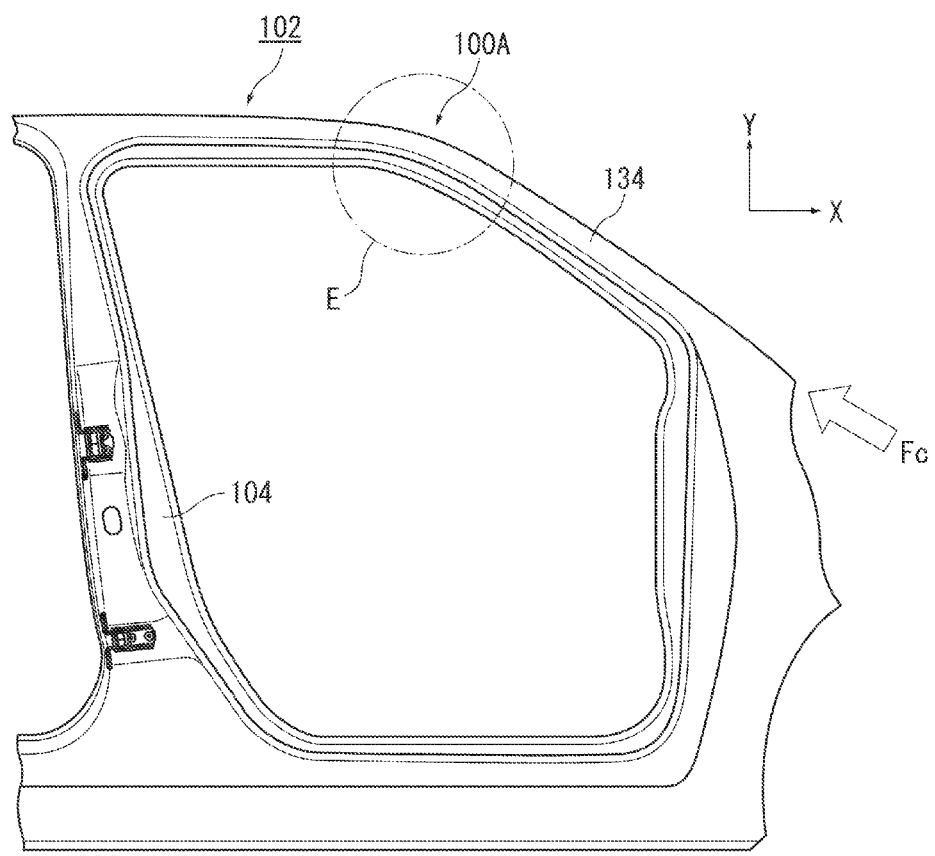
FIG. 6 is a diagram illustrating a pillar structure of a modified example.

FIG. 6 is a diagram illustrating a pillar structure 100A of a modified example. In the pillar structure 100A, the structure of the above-described embodiment is applied not to the above center pillar 104 but to a region E of a front pillar 134 that has a large curvature. With such a pillar structure 100A, the front pillar 134 is hard to deform when a load Fc is input from the vehicle front side.

Moreover, although in the above-described embodiment, the dimensions of the front surface 128a and the rear surface 128*b* of the inner panel 116 in the vehicle width direction change continuously, it is preferable that the curvature of the base surface 130 of the inner panel 116 is constant from the upper end 112 to the lower end 114 of the center pillar 104, for example. Thereby, the curvature of the inner panel 116 is constant and the inner panel 116 is smooth as a whole, and the concentration of bending force can be further avoided, thus making it possible to reliably improve the durability against the loads.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention can be used in a center pillar structure extending in a vertical direction at the center of a lateral portion of a vehicle body.

The invention claimed is:

1. A center pillar structure for a vehicle comprising a center pillar extending in a vertical direction at a center of a lateral portion of a vehicle body, the center pillar being curved or inclined toward the vehicle interior side at least above a belt line,
   wherein the center pillar includes:
      an outer panel in which a curvature is at its maximum near the belt line, as viewed from a vehicle front side; and
      an inner panel that is joined to the outer panel on the vehicle interior side and forms a closed cross section together with the outer panel,
   wherein the center pillar structure for the vehicle further comprises an upper door hinge and a lower door hinge that are attached to the outer panel at positions spaced apart from each other in the vertical direction below the belt line and support a vehicle door such that the vehicle door can be opened and closed,
   wherein the inner panel includes:
      a front flange and a rear flange that are disposed spaced apart from each other in a vehicle front-rear direction, are joined to the outer panel, and are elongate in the vertical direction;
      a front surface and a rear surface that extend toward the vehicle interior side respectively from a rear end of the front flange and a front end of the rear flange; and
      a base surface, having a curvature, that connects the front surface and the rear surface,
   wherein dimensions of the front surface and the rear surface in a vehicle width direction increase as the center pillar extends upward from a height below the upper door hinge to a height of the belt line, and decrease as the center pillar extends upward from the belt line to the upper end of the center pillar, and
   wherein the curvature of the base surface in the vertical direction decreases and is unique from the curvature near the belt line of the outer panel.

2. The center pillar structure for a vehicle according to claim 1, wherein a curvature of the inner panel is constant from the upper end of the center pillar to the height below the upper door hinge.

* * * * *